US011078958B1

(12) United States Patent
McLain et al.

(10) Patent No.: US 11,078,958 B1
(45) Date of Patent: Aug. 3, 2021

(54) COMPRESSION LIMITER (71) Applicant: APQ Development, LLC, Jackson, MI (US)

(72) Inventors: Lee McLain, Jonesville, MI (US); Justin Joughin, Morenci, MI (US)

(73) Assignee: APQ Development, LLC, Jackson, MI (US)

( * ) Notice: Subject to any disclaimer, the term of this patent is extended or adjusted under 35 U.S.C. 154(b) by 0 days.

(21) Appl. No.: 17/000,670

(22) Filed: Aug. 24, 2020

(51) Int. Cl.
*F16C 33/06* (2006.01)
*F16F 9/58* (2006.01)
*F16B 43/00* (2006.01)

(52) U.S. Cl.
CPC .............. *F16C 33/06* (2013.01); *F16B 43/00* (2013.01); *F16F 9/58* (2013.01)

(58) Field of Classification Search
CPC ...... F16B 5/0258; F16B 43/00; F16B 43/001; F16C 33/06; F16F 9/58; Y10T 403/75; B60R 16/0222
USPC .......................... 411/371.2, 372, 546; 16/2.1
See application file for complete search history.

(56) References Cited

U.S. PATENT DOCUMENTS

| 945,403 | A | * | 1/1910 | Mohun | F16B 13/068 411/24 |
| 1,276,708 | A | * | 8/1918 | Bair | F16B 13/066 411/53 |
| 1,369,239 | A | | 2/1921 | Gulick | |
| 1,399,943 | A | | 12/1921 | Dunham | |
| 1,421,440 | A | | 7/1922 | Fisher | |
| 1,460,513 | A | * | 7/1923 | Ross | B62D 1/16 74/490 |
| 1,800,585 | A | | 4/1931 | Woolson | |
| 2,236,496 | A | * | 4/1941 | Beggs | H01G 9/00 248/27.3 |
| 2,440,815 | A | | 5/1948 | Wharam et al. | |
| 2,447,299 | A | * | 8/1948 | Williams | F16D 1/096 403/247 |
| 3,164,054 | A | * | 1/1965 | Biesecker | F16B 9/02 24/662 |
| 3,211,256 | A | | 10/1965 | Teutsch | |
| 3,243,206 | A | * | 3/1966 | Samer | H02G 3/0616 285/154.1 |
| 3,438,686 | A | * | 4/1969 | Stone | F16C 17/10 384/296 |
| 3,504,769 | A | | 4/1970 | Mettig | |
| 3,509,861 | A | | 5/1970 | Deutschmann et al. | |
| 3,592,293 | A | | 7/1971 | Frincke | |
| 3,773,144 | A | | 11/1973 | Hummel | |
| 3,829,184 | A | * | 8/1974 | Chevret | F16C 27/02 384/280 |

(Continued)

*Primary Examiner* — Roberta S Delisle
(74) *Attorney, Agent, or Firm* — Honigman LLP; Brett A. Krueger (57) ABSTRACT

A compression limiter is configured for incorporation within a vehicle component. The compression limiter includes a tubular bushing extending from a first end to a second end. The tubular bushing includes an exterior surface and an interior surface extending from the first end to the second end to define an aperture through the tubular bushing. The compression limiter also includes one or more detents formed in at least one of the first end of the bushing and/or the second end of the bushing. In some examples, the compression limiter includes a first pair of the detents formed in the first end and a second pair of the detents formed in the second end.

16 Claims, 8 Drawing Sheets

(56) References Cited

U.S. PATENT DOCUMENTS

| | | | |
|---|---|---|---|
| 3,904,528 A | 9/1975 | Yocum | |
| 4,021,344 A | 5/1977 | Webb | |
| 4,056,168 A | 11/1977 | Bajohr | |
| 4,129,503 A | 12/1978 | Joseph | |
| 4,179,379 A | 12/1979 | Mitchell | |
| 4,224,161 A | 9/1980 | Anderson et al. | |
| 4,351,550 A | 9/1982 | Anderson et al. | |
| 4,417,383 A | 11/1983 | Anderson et al. | |
| 4,616,610 A | 10/1986 | Ishida | |
| 4,768,936 A | 9/1988 | Etemad et al. | |
| 4,804,466 A | 2/1989 | Cooper et al. | |
| 4,828,694 A | 5/1989 | Leason | |
| 4,930,469 A | 6/1990 | Kamprath et al. | |
| 5,049,274 A | 9/1991 | Leason et al. | |
| 5,088,579 A | 2/1992 | Kim et al. | |
| 5,099,954 A | 3/1992 | Kikuchi et al. | |
| 5,130,014 A | 7/1992 | Volz | |
| 5,176,174 A | 1/1993 | Toraason et al. | |
| 5,377,781 A | 1/1995 | Yun | |
| 5,452,693 A | 9/1995 | Clark | |
| 5,531,196 A | 7/1996 | Clark | |
| 5,538,633 A | 7/1996 | Kitajima et al. | |
| 5,863,081 A | 1/1999 | Katayama et al. | |
| 5,988,134 A | 11/1999 | Smietanski | |
| 6,041,752 A | 3/2000 | Van Klompenburg | |
| 6,142,257 A | 11/2000 | Bruener et al. | |
| 6,165,373 A | 12/2000 | Agner | |
| 6,190,546 B1 | 2/2001 | Agner | |
| 6,257,193 B1 | 7/2001 | Alpan et al. | |
| 6,260,534 B1 | 7/2001 | Kampichler et al. | |
| 6,289,865 B1 | 9/2001 | Spix | |
| 6,293,743 B1 * | 9/2001 | Ernst | F16B 13/066 411/24 |
| 6,478,114 B2 | 11/2002 | Ito et al. | |
| 6,484,846 B1 | 11/2002 | Parker | |
| 6,520,293 B1 | 2/2003 | Ogawa et al. | |
| 6,523,561 B2 | 2/2003 | Kapcoe et al. | |
| 6,524,476 B1 | 2/2003 | Caiozza | |
| 6,539,912 B1 | 4/2003 | Beer | |
| 6,584,950 B1 | 7/2003 | Cunningham | |
| 6,640,769 B2 | 11/2003 | Nomura et al. | |
| 6,712,544 B2 * | 3/2004 | Kruger | F16B 5/0233 403/370 |
| 6,742,490 B2 | 6/2004 | Meisner | |
| 6,796,283 B1 | 9/2004 | Fleury et al. | |
| 6,811,383 B2 | 11/2004 | Maier | |
| 6,845,743 B1 | 1/2005 | Bishop | |
| 7,047,927 B2 | 5/2006 | Hashimoto et al. | |
| 7,096,845 B1 | 8/2006 | Vaandrager et al. | |
| 7,124,730 B2 | 10/2006 | Schwarzl et al. | |
| 7,128,218 B2 | 10/2006 | Rosendahl et al. | |
| 7,140,934 B2 | 11/2006 | Hoi | |
| 7,171,937 B2 | 2/2007 | Hada et al. | |
| 7,210,562 B2 | 5/2007 | Morii et al. | |
| 7,220,056 B2 * | 5/2007 | Kubota | B62D 1/16 384/215 |
| 7,261,079 B2 | 8/2007 | Gunji et al. | |
| 7,270,104 B2 | 9/2007 | Hashimoto et al. | |
| 7,383,809 B2 | 6/2008 | Rosendahl et al. | |
| 7,398,858 B2 | 7/2008 | Bicker et al. | |
| 7,418,938 B2 | 9/2008 | Hashimoto et al. | |
| 7,422,021 B2 | 9/2008 | Leaphart | |
| 7,451,736 B2 | 11/2008 | Migaud et al. | |
| 7,478,618 B2 | 1/2009 | Hashimoto et al. | |
| 7,571,705 B2 | 8/2009 | Inaba | |
| 7,655,078 B2 | 2/2010 | Saito et al. | |
| 7,681,890 B2 | 3/2010 | Griffin et al. | |
| 7,699,571 B2 * | 4/2010 | Booher | F16B 5/02 411/546 |
| 7,748,500 B2 | 7/2010 | Nagano et al. | |
| 7,757,656 B2 | 7/2010 | Hoi et al. | |
| 7,767,084 B2 | 8/2010 | Jinbo et al. | |
| 7,841,313 B2 | 11/2010 | Hashimoto et al. | |
| 7,878,085 B2 | 2/2011 | Keyaki et al. | |
| 7,922,005 B2 | 4/2011 | Haladyna | |
| 7,958,861 B2 | 6/2011 | Klumpp et al. | |
| 7,992,534 B2 | 8/2011 | Hashimoto et al. | |
| 8,011,340 B2 | 9/2011 | Bicker et al. | |
| 8,011,342 B2 | 9/2011 | Bluhm | |
| 8,038,877 B2 | 10/2011 | Stausberg et al. | |
| 8,066,100 B2 | 11/2011 | Mori et al. | |
| 8,075,772 B2 | 12/2011 | Suga | |
| 8,113,167 B2 | 2/2012 | Jessberger et al. | |
| 8,125,601 B2 | 2/2012 | Kim et al. | |
| 8,146,561 B2 | 4/2012 | Pryor et al. | |
| 8,297,251 B2 | 10/2012 | Asaya | |
| 8,297,407 B2 | 10/2012 | Mori et al. | |
| 8,336,515 B2 | 12/2012 | Jainek et al. | |
| 8,443,777 B2 | 5/2013 | Enokida | |
| 8,464,683 B2 | 6/2013 | Hashimoto et al. | |
| 8,635,983 B2 | 1/2014 | Enokida | |
| 8,657,543 B2 * | 2/2014 | Fabre | F16B 13/066 411/44 |
| 8,673,141 B2 | 3/2014 | Stausberg et al. | |
| 8,734,642 B2 | 5/2014 | Fauchet | |
| 8,893,896 B2 | 11/2014 | Nishikawa | |
| 9,028,221 B2 | 5/2015 | Hritz | |
| 9,353,851 B2 | 5/2016 | Kubota et al. | |
| 9,376,942 B2 | 6/2016 | Noguchi et al. | |
| 9,441,746 B2 | 9/2016 | Borlon et al. | |
| 9,567,880 B2 | 2/2017 | Shieh et al. | |
| 9,573,085 B2 | 2/2017 | Beer et al. | |
| 9,604,163 B2 | 3/2017 | Hatae et al. | |
| 9,677,436 B2 | 6/2017 | Mordukhovich | |
| 9,719,460 B2 | 8/2017 | Kong et al. | |
| 9,719,463 B2 | 8/2017 | Oltmans et al. | |
| 9,771,840 B2 | 9/2017 | Zahdeh | |
| 9,784,149 B2 | 10/2017 | Matsuda et al. | |
| 9,903,241 B2 | 2/2018 | Hellman et al. | |
| 9,944,374 B1 | 4/2018 | Anderson et al. | |
| 9,964,011 B2 | 5/2018 | Mukohara | |
| 10,086,318 B2 | 10/2018 | Eleftherakis et al. | |
| 10,113,458 B2 | 10/2018 | Takatsugi | |
| 10,132,215 B2 | 11/2018 | Nagai et al. | |
| 10,167,753 B2 | 1/2019 | Mukohara et al. | |
| 10,227,903 B2 | 3/2019 | Viola et al. | |
| 10,247,065 B2 | 4/2019 | Mercier | |
| 10,260,387 B2 | 4/2019 | Kong et al. | |
| 10,294,889 B2 | 5/2019 | Oltmans et al. | |
| D852,319 S | 6/2019 | Hellman et al. | |
| 10,344,640 B2 | 7/2019 | Miyamura et al. | |
| 10,359,015 B2 | 7/2019 | Pinault | |
| 10,371,249 B1 | 8/2019 | Bluhm et al. | |
| 10,385,741 B2 | 8/2019 | Petridis et al. | |
| 10,494,962 B2 | 12/2019 | Yuki et al. | |
| 10,494,964 B2 | 12/2019 | Heckman et al. | |
| 10,508,571 B2 | 12/2019 | Blundy | |
| 10,570,788 B2 | 2/2020 | Bennett et al. | |
| 10,677,343 B2 | 6/2020 | Howard et al. | |
| 10,695,883 B2 | 6/2020 | Hugel | |
| 10,724,406 B2 | 7/2020 | Hellman et al. | |
| 2002/0007984 A1 | 1/2002 | Ito et al. | |
| 2002/0096221 A1 | 7/2002 | Kapcoe et al. | |
| 2003/0037758 A1 | 2/2003 | Nomura et al. | |
| 2003/0152464 A1 | 8/2003 | Maier | |
| 2004/0007520 A1 | 1/2004 | Rosendahl et al. | |
| 2004/0060533 A1 | 4/2004 | Meisner | |
| 2004/0084250 A1 | 5/2004 | Morii et al. | |
| 2004/0141128 A1 | 7/2004 | Kim et al. | |
| 2004/0231924 A1 | 11/2004 | Schwarzl et al. | |
| 2005/0268877 A1 | 12/2005 | Hashimoto et al. | |
| 2005/0279314 A1 | 12/2005 | Hada et al. | |
| 2005/0281693 A1 | 12/2005 | Roberts | |
| 2006/0068656 A1 | 3/2006 | Hoi | |
| 2006/0137940 A1 | 6/2006 | Gunji et al. | |
| 2006/0180116 A1 | 8/2006 | Vaandrager et al. | |
| 2006/0191506 A1 | 8/2006 | Hashimoto et al. | |
| 2006/0219620 A1 | 10/2006 | Suga | |
| 2007/0017745 A1 | 1/2007 | Rosendahl et al. | |
| 2007/0062562 A1 | 3/2007 | Leaphart | |
| 2007/0163442 A1 | 7/2007 | Saito et al. | |
| 2007/0221447 A1 | 9/2007 | Bicker et al. | |
| 2007/0272194 A1 | 11/2007 | Hoi et al. | |
| 2007/0272195 A1 | 11/2007 | Keyaki et al. | |

(56) References Cited

U.S. PATENT DOCUMENTS

| | | |
|---|---|---|
| 2007/0289569 A1 | 12/2007 | Migaud et al. |
| 2008/0011260 A1 | 1/2008 | Hashimoto et al. |
| 2008/0017158 A1 | 1/2008 | Hashimoto et al. |
| 2008/0047521 A1 | 2/2008 | Koyama |
| 2008/0078352 A1 | 4/2008 | Inaba |
| 2008/0157483 A1* | 7/2008 | Booher .................. F16B 5/02 277/593 |
| 2008/0168633 A1* | 7/2008 | Kim .................. F16B 5/0657 24/572.1 |
| 2008/0210491 A1 | 9/2008 | Mori et al. |
| 2008/0216789 A1 | 9/2008 | Hashimoto et al. |
| 2008/0237111 A1 | 10/2008 | Haladyna |
| 2008/0264727 A1 | 10/2008 | Nagano et al. |
| 2008/0283020 A1 | 11/2008 | Bicker et al. |
| 2008/0290013 A1 | 11/2008 | Stausberg et al. |
| 2009/0045129 A1 | 2/2009 | Jinbo et al. |
| 2009/0074537 A1* | 3/2009 | Attanasio ............ F16B 37/044 411/511 |
| 2009/0139482 A1 | 6/2009 | Bicker et al. |
| 2009/0230049 A1 | 9/2009 | Stausberg et al. |
| 2009/0301954 A1 | 12/2009 | Beer et al. |
| 2010/0012074 A1 | 1/2010 | Asaya |
| 2010/0012075 A1 | 1/2010 | Bluhm |
| 2010/0037849 A1 | 2/2010 | Jainek et al. |
| 2010/0108019 A1 | 5/2010 | Klumpp et al. |
| 2010/0133164 A1 | 6/2010 | Nishikawa |
| 2010/0162988 A1 | 7/2010 | Enokida |
| 2010/0212623 A1 | 8/2010 | Jessberger et al. |
| 2010/0224450 A1 | 9/2010 | Dods et al. |
| 2010/0300395 A1 | 12/2010 | Enokida |
| 2011/0067666 A1 | 3/2011 | Hashimoto et al. |
| 2011/0253091 A1 | 10/2011 | Hashimoto et al. |
| 2012/0037456 A1 | 2/2012 | Mori et al. |
| 2012/0073527 A1 | 3/2012 | Oltmans et al. |
| 2012/0073537 A1 | 3/2012 | Oltmans et al. |
| 2012/0085689 A1 | 4/2012 | Fauchet |
| 2012/0210971 A1 | 8/2012 | Noguchi et al. |
| 2012/0234741 A1 | 9/2012 | Hritz |
| 2012/0305469 A1 | 12/2012 | Stausberg et al. |
| 2014/0116931 A1 | 5/2014 | Beer et al. |
| 2014/0166401 A1 | 6/2014 | Kubota et al. |
| 2014/0197085 A1 | 7/2014 | Stausberg et al. |
| 2014/0373939 A1 | 12/2014 | Borlon et al. |
| 2015/0028038 A1 | 1/2015 | Franz |
| 2015/0090216 A1 | 4/2015 | Hatae et al. |
| 2015/0096527 A1 | 4/2015 | Kong et al. |
| 2015/0096840 A1 | 4/2015 | Kong et al. |
| 2015/0114897 A1 | 4/2015 | Eleftherakis et al. |
| 2015/0129471 A1 | 5/2015 | Beer et al. |
| 2015/0129727 A1 | 5/2015 | Marsar et al. |
| 2015/0136064 A1 | 5/2015 | Matsuda et al. |
| 2015/0247431 A1 | 9/2015 | Yuki et al. |
| 2015/0300220 A1 | 10/2015 | Mordukhovich |
| 2016/0069364 A1* | 3/2016 | Montague ............ F16B 41/002 411/511 |
| 2016/0245135 A1 | 8/2016 | Zahdeh |
| 2016/0245136 A1 | 8/2016 | Takatsugi |
| 2016/0281555 A1 | 9/2016 | Nagai et al. |
| 2016/0319714 A1 | 11/2016 | Shieh et al. |
| 2016/0319715 A1 | 11/2016 | Shieh et al. |
| 2017/0138232 A1 | 5/2017 | Hellman et al. |
| 2017/0218802 A1 | 8/2017 | Takano |
| 2017/0268393 A1 | 9/2017 | Pekarsky et al. |
| 2017/0276036 A1 | 9/2017 | Mukohara et al. |
| 2017/0276038 A1 | 9/2017 | Mukohara |
| 2017/0362972 A1 | 12/2017 | Mercier |
| 2017/0368656 A1 | 12/2017 | Hugel |
| 2017/0370336 A1 | 12/2017 | Pinault |
| 2018/0031107 A1 | 2/2018 | Howard et al. |
| 2018/0135477 A1 | 5/2018 | Hellman et al. |
| 2018/0135478 A1 | 5/2018 | Blundy |
| 2018/0202330 A1 | 7/2018 | Petridis et al. |
| 2018/0283244 A1 | 10/2018 | Fujinuma et al. |
| 2018/0283245 A1 | 10/2018 | Miyamura et al. |
| 2018/0298797 A1 | 10/2018 | Heckman et al. |
| 2018/0334934 A1 | 11/2018 | Hellman et al. |
| 2018/0347415 A9 | 12/2018 | Mercier |
| 2018/0347420 A1 | 12/2018 | Bedi et al. |
| 2019/0024544 A1 | 1/2019 | Viola et al. |
| 2019/0072014 A1 | 3/2019 | Hutchins |
| 2019/0072015 A1 | 3/2019 | Hutchins |
| 2019/0128155 A1 | 5/2019 | Bennett et al. |
| 2019/0264589 A1 | 8/2019 | Lechartier et al. |
| 2019/0264635 A1 | 8/2019 | Oltmans et al. |
| 2019/0285161 A1 | 9/2019 | Rosendahl et al. |
| 2020/0049035 A1 | 2/2020 | Feng et al. |
| 2020/0116052 A1 | 4/2020 | Pekarsky et al. |
| 2020/0116053 A1 | 4/2020 | Blundy |
| 2020/0149446 A1 | 5/2020 | Owaki |
| 2020/0182155 A1 | 6/2020 | Shen et al. |

* cited by examiner

COMPRESSION LIMITER

TECHNICAL FIELD

This disclosure relates to a compression limiter.

BACKGROUND

Automotive components are commonly formed of or include materials that are lightweight and have a relatively low hardness, such as plastics. While these materials provide suitable strength for their intended purpose, they may be subject to deformation under the effect of higher forces. For example, when plastic components are attached to a vehicle interface using threaded fasteners, such as bolts, the portions of the plastic component compressed by a head of the bolt may deform or compress.

SUMMARY

One aspect of the disclosure provides a compression limiter having a tubular bushing extending from a first end to a second end, the tubular bushing including an exterior surface and an interior surface extending from the first end to the second end to define an aperture, and one or more detents formed in at least one of the first end of the bushing and/or the second end of the bushing.

Implementations of the disclosure may include one or more of the following optional features. In some implementations the interior surface is cylindrical and defines an inside diameter of the bushing and the exterior surface is cylindrical and defines an outside diameter of the bushing. In some examples, each of the one or more detents extends through the bushing from the exterior surface to the interior surface.

In some implementations, the one or more detents includes a pair of detents formed in the first end of the bushing. Here, the compression limiter may further include a second pair of the detents formed in the second end of the bushing. Optionally, a distance from the cylindrical end to the first end defines a depth of the detent and a distance from a first one of the sidewalls to a second one of sidewalls defines a width of the detent that is equal to the depth of the detent.

In some examples, the bushing includes a chamfered edge at an intersection of the exterior surface with at least one of the first end and the second end. In some configurations, the bushing includes a metal alloy. Optionally, the bushing is zinc plated.

In some configurations, each of the one or more detents includes a cylindrical end and a pair of sidewalls connecting the cylindrical end to one of the first end or the second end of the bushing.

Another aspect of the disclosure provides a compression limiter including tubular bushing extending from a first end to a second end, the tubular bushing including an exterior surface and an interior surface extending from the first end to the second end to define an aperture. The compression limiter also includes a plurality of detents including a first detent formed in the first end of the bushing and a second detent formed in the second end of the bushing.

This aspect may include one or more of the following optional features. In some examples, the interior surface is cylindrical and defines an inside diameter of the bushing and the exterior surface is cylindrical and defines an outside diameter of the bushing. In some configurations, each of the one or more detents extends through the bushing from the exterior surface to the interior surface.

In some implementations, the one or more detents includes a pair of detents formed in the first end of the bushing. Here, the compression limiter may include a second pair of the detents formed in the second end of the bushing.

In some examples, each of the one or more detents includes a cylindrical end and a pair of sidewalls connecting the cylindrical end to the one of the first end or the second end of the bushing. Here, a distance from the cylindrical end to the one of the first end or the second end defines a depth of the detent and a distance from a first one of the sidewalls to a second one of sidewalls defines a width of the detent that is equal to the depth of the detent.

In some configurations, the bushing includes a chamfered edge at an intersection of the exterior surface with at least one of the first end and the second end.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 6:
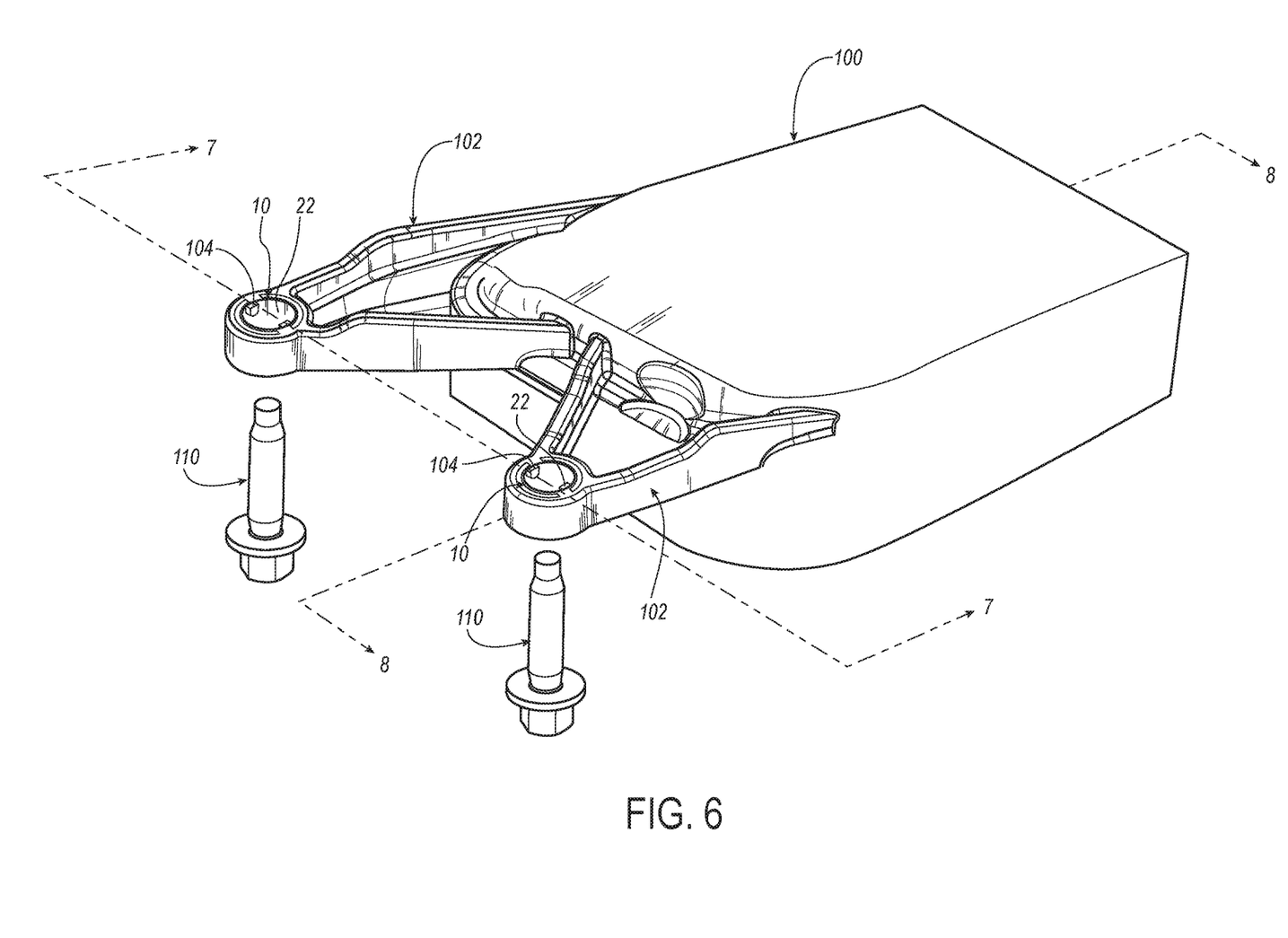
FIG. 6 is an environmental view of the compression limiter of FIG. 1 incorporated into a mounting tab of a vehicle component.
Figure 7:
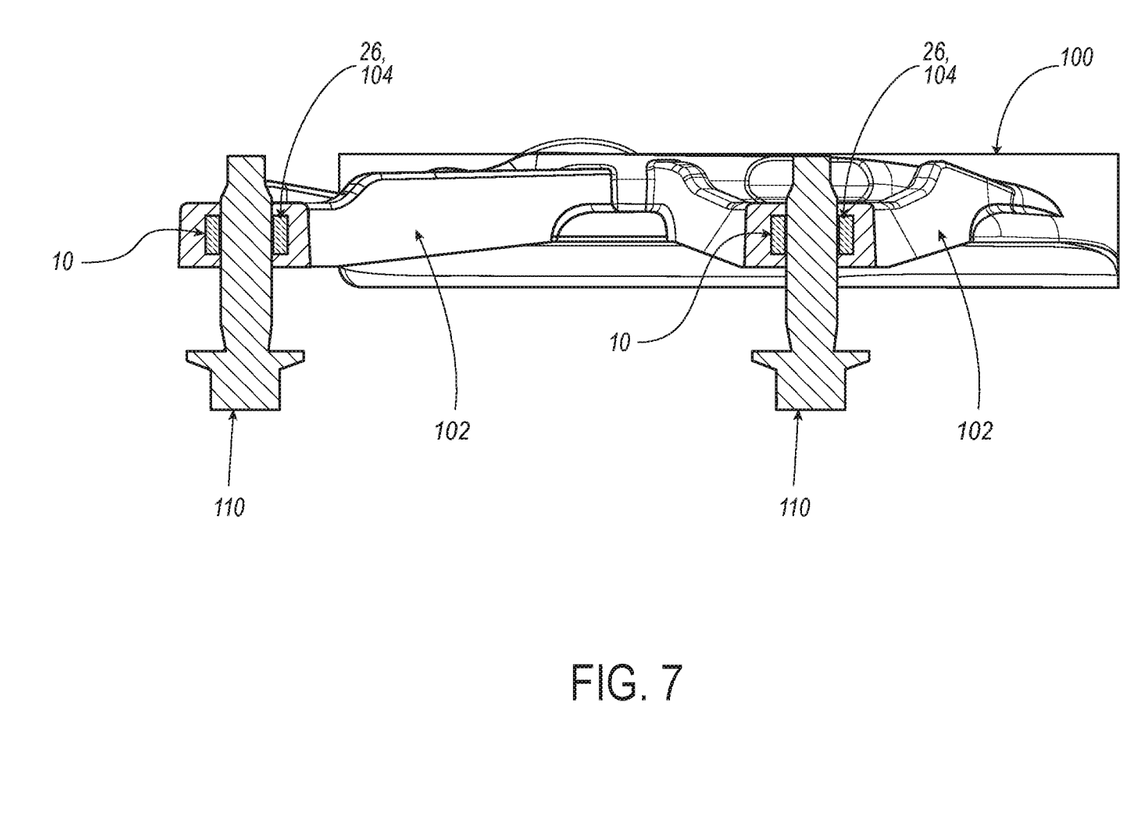
FIG. 7 is a cross-sectional view of the vehicle component of FIG. 6, taken along Line 7-7 of FIG. 6.
Figure 8:
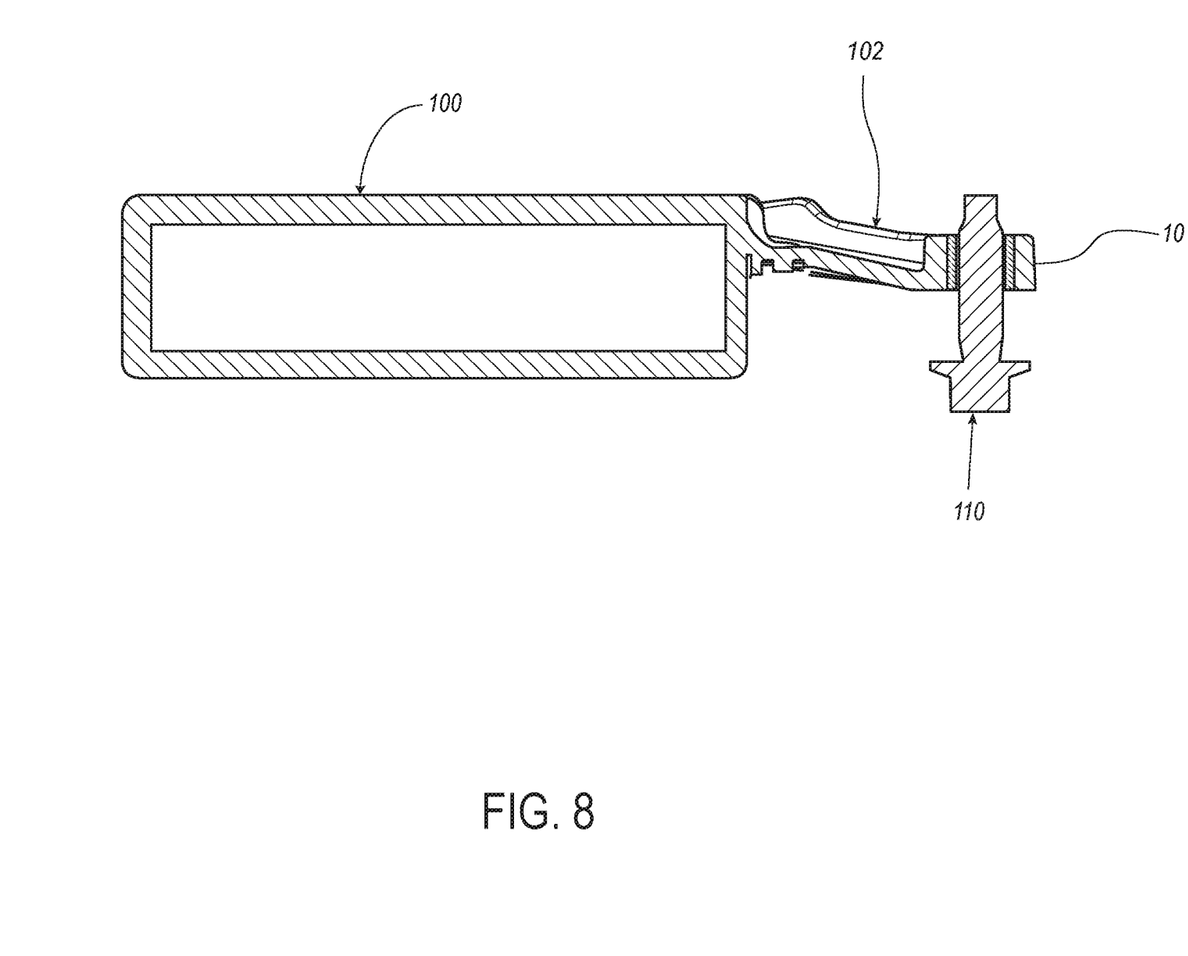
FIG. 8 is a cross-sectional view of the vehicle component of FIG. 6, taken along Line 8-8 of FIG. 6.

Referring to FIGS. 1-8, in some implementations, a compression limiter 10 is configured to be disposed within a mounting tab 102 of a vehicle component 100. Particularly, the compression limiter 10 includes a first material having a first hardness and is configured to be disposed within the mounting tab 102 including a second material having a second hardness that is less than the first hardness. As shown in FIGS. 6-8, the compression limiter 10 provides the mounting tab 102 of the vehicle component 100 with an attachment interface capable of withstanding compressive forces imparted by a fastener 110 when the vehicle component 100 is installed at a corresponding vehicle mounting location.

With reference to FIGS. 1-5, the compression limiter 10 includes a tubular bushing 12 extending from a first end 14 to a second end 16. The bushing 12 includes a cylindrical exterior surface 18 extending from the first end 14 to the second end 16 and a cylindrical interior surface 20 extending from the first end 14 to the second end 16. The exterior surface 18 defines an outside diameter $D_{18}$ of the bushing 12 and the interior surface 20 defines an inside diameter $D_{20}$ of the bushing 12.

The interior surface 20 forms an aperture 22 extending through the entire length of the bushing 12. The aperture 22 is configured as a clearance hold for receiving a corresponding fastener 110, as discussed later. Accordingly, sizes of the inside diameter $D_{20}$ and the outside diameter $D_{18}$ may vary depending on a size of the corresponding fastener 110. In some examples, a ratio of the outside diameter DB to the inside diameter $D_{20}$ ranges from 1.20:1 to 1.55:1, and more specifically, from 1.30:1 to 1.45:1, and even more specifically, from 1.32:1 to 1.42:1.

With continued reference to FIGS. 1-5, each of the first end 14 and the second end 16 of the bushing 12 are substantially planar. Each end 14, 16 of the bushing 12 may include a broken or chamfered edge 24 formed at the intersection of the end 14, 16 and the exterior surface 18. A distance from the first end 14 to the second end 16 defines a length $L_{12}$ of the bushing 12. In the illustrated example, a ratio of the length $L_{12}$ of the bushing 12 to the inside diameter $D_{20}$ of the bushing ranges from 1:0.50 to 2:1, and more specifically, from 1:1 to 1.5:1, and more specifically from 1.13 to 1.16. However, other lengths $L_{12}$ of the bushing 12 may also be utilized.

Figure 1:
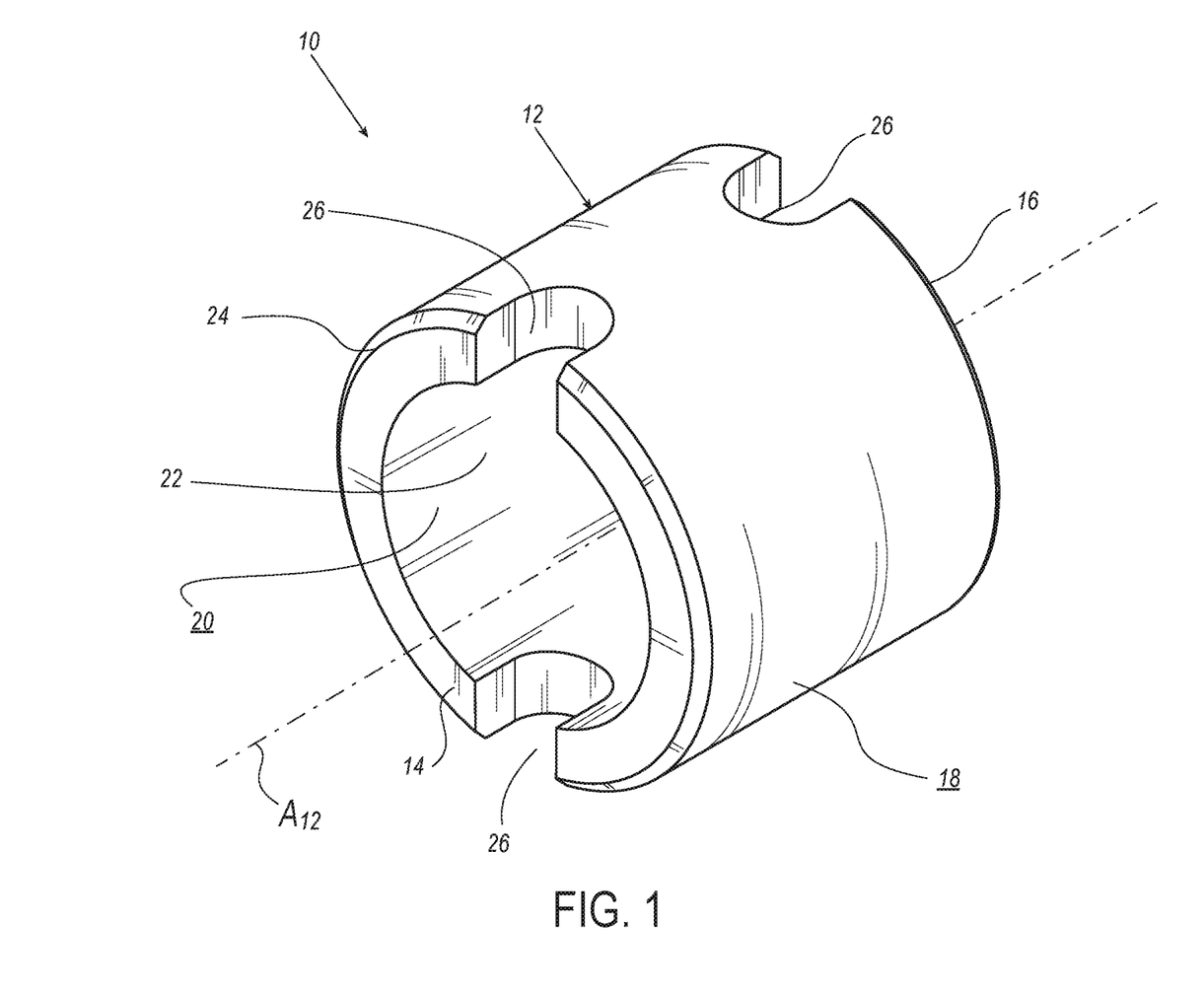
FIG. 1 is front perspective view of a compression limiter according to the principles of the present disclosure.
Figure 2:
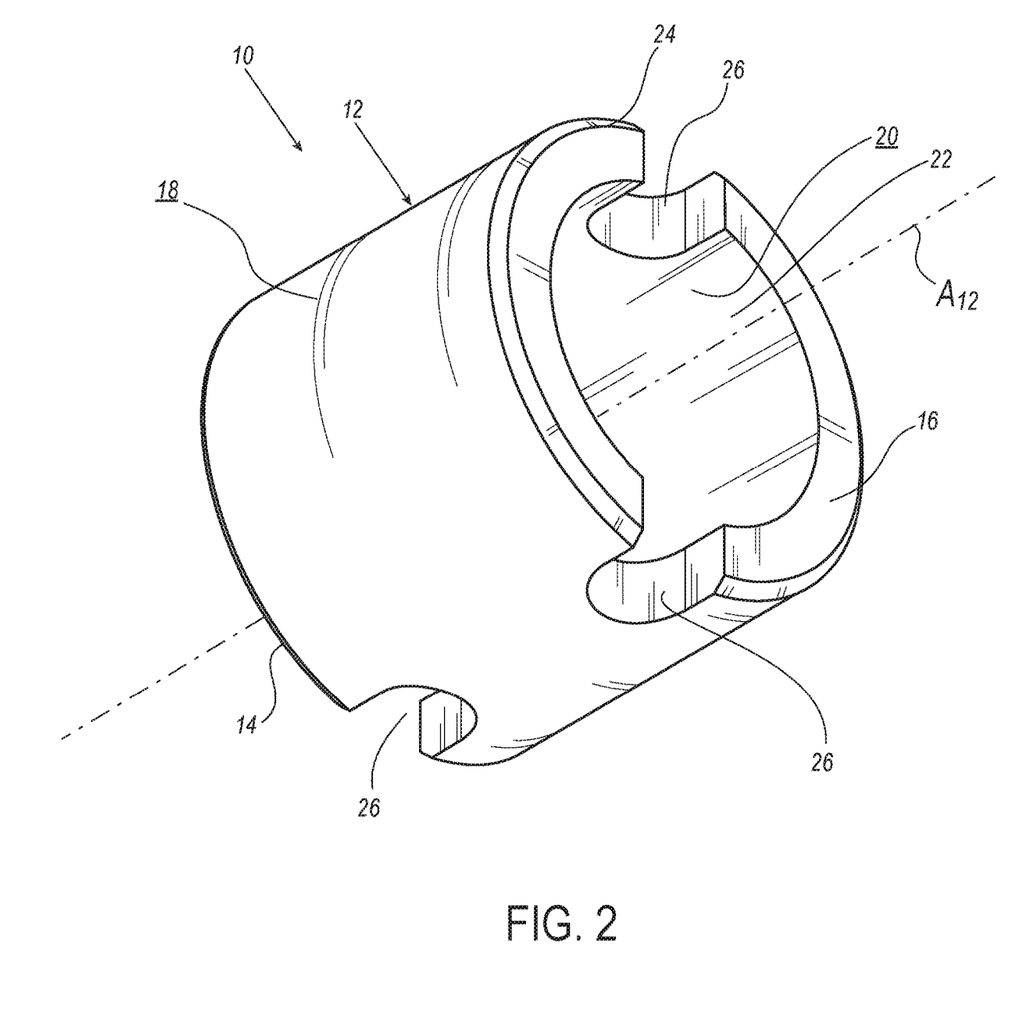
FIG. 2 is a rear perspective view of the compression limiter of FIG. 1.
Figure 3:
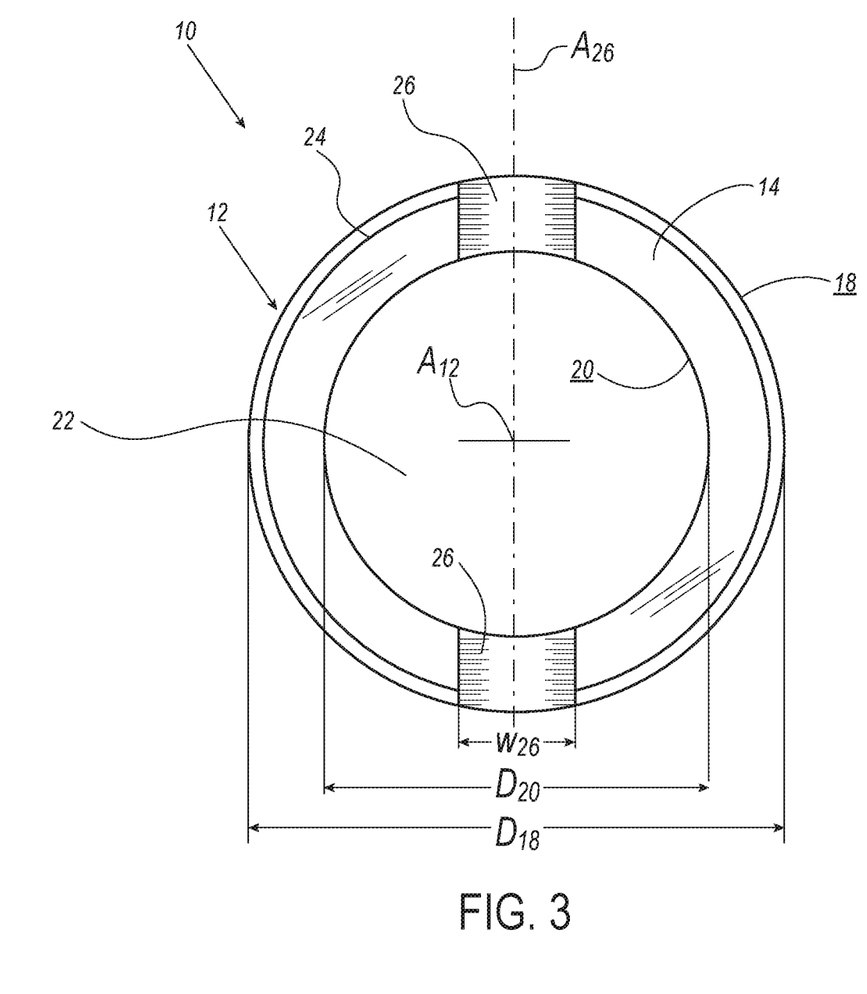
FIG. 3 is a top plan view of the compression limiter of FIG. 1.
Figure 4:
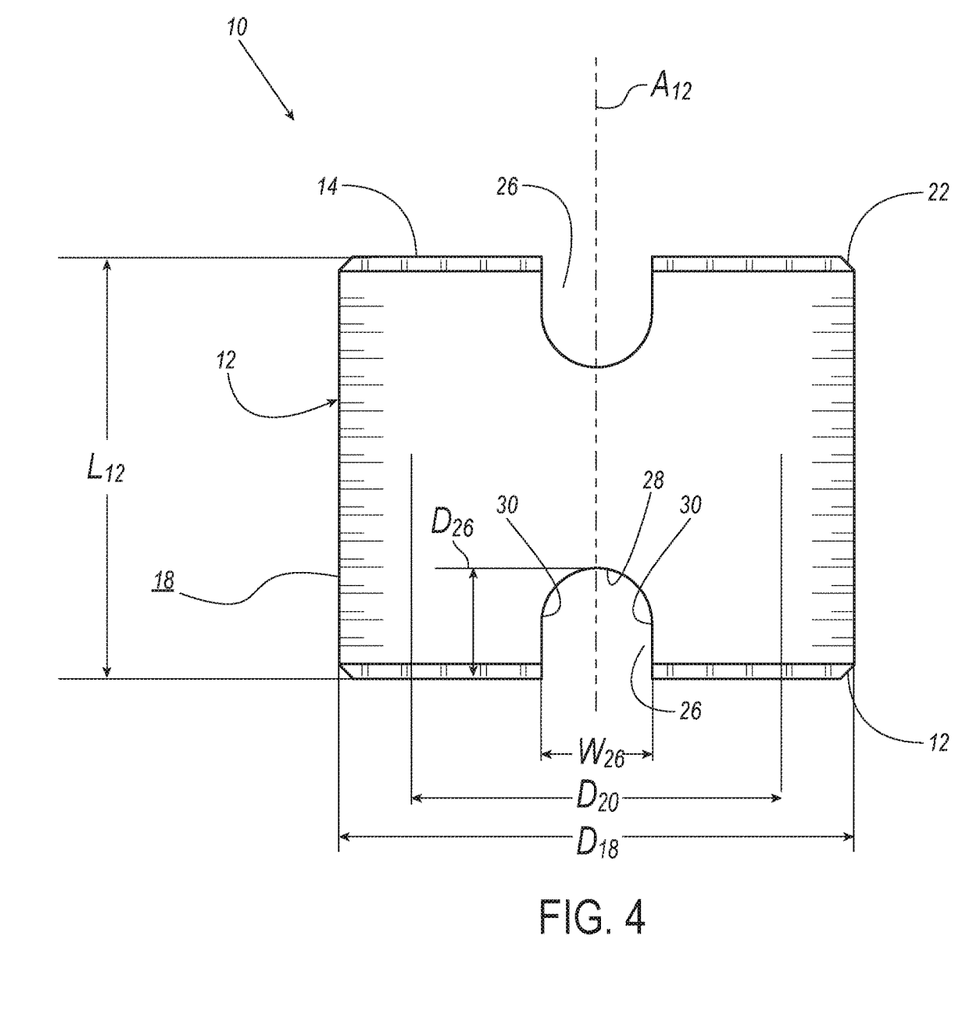
FIG. 4 is a front elevation view of the compression limiter of FIG. 1.
Figure 5:
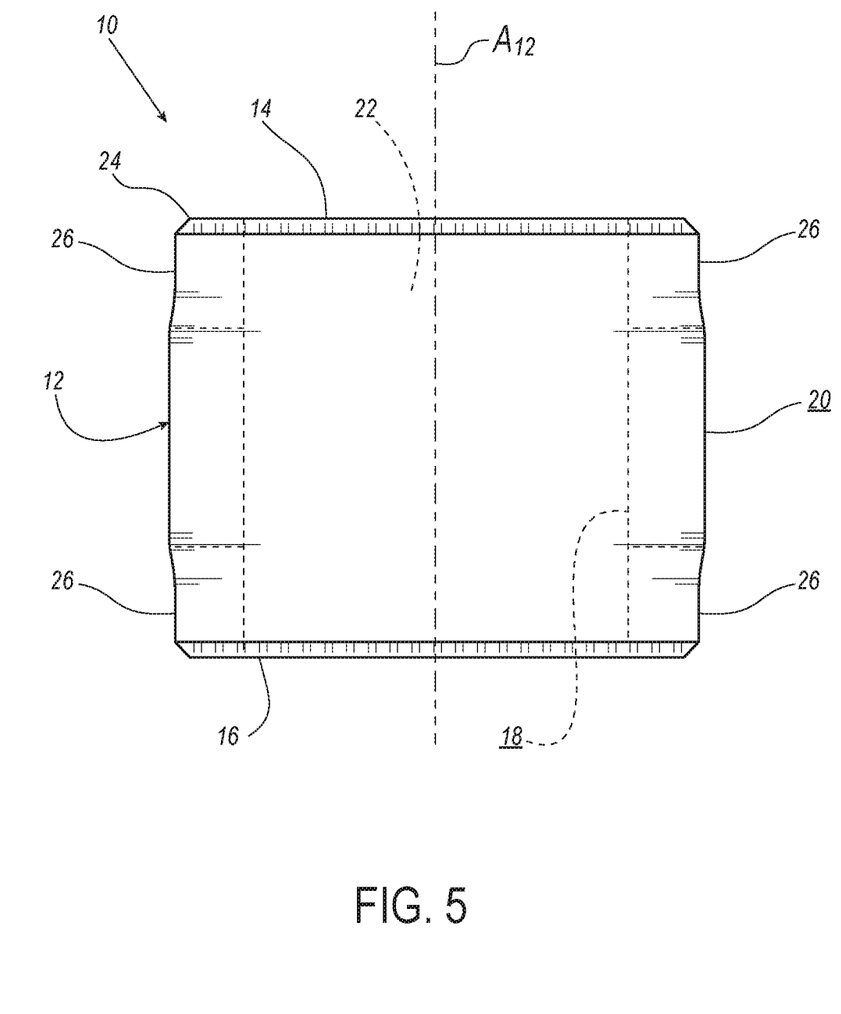
FIG. 5 is a side elevation view of the compression limiter of FIG. 1.

Each end 14, 16 of the bushing 12 further includes at least one detent 26 formed as a notch extending continuously from the exterior surface 18 to the interior surface 20. As shown in FIG. 3, each end 14, 16 includes a pair of the detents 26 formed on opposite sides of the bushing 12, such that the detents 26 are aligned with each other along a common axis $A_{26}$ that intersects the longitudinal axis $A_{12}$ of the bushing 12. Stated differently, the end 14 includes a pair of detents 26 diametrically opposed to one another and the end 16 includes a pair of detents 26 diametrically opposed to one another. Referring to FIGS. 1, 2, and 4, each one of the detents 26 formed at the first end 14 may be rotationally aligned with a corresponding one of the detents 26 formed at the opposite second end 16 of the bushing. However, in other examples, the detents 26 at one end 14, 16 may be rotationally offset from the detents 26 at the other end 16.

In the illustrated example, each of the detents 26 is defined by a semi-cylindrical end 28 connected to one of the ends 14, 16 of the bushing 12 by an opposing pair of flat sidewalls 30. A distance from the end 28 of the detent 26 to the end 14, 16 defines a depth $D_{26}$ of the detent 26 and a distance from one of the sidewalls 30 to the other of the sidewalls 30 defines a width $W_{26}$ of each of the detents 26, as indicated in FIG. 4. In the illustrated example, the width $W_{26}$ of the detents 26 is equal to the depth $D_{26}$ of the detents 26. Thus, a radius of the end 28 is equal to half of the depth $D_{26}$. A ratio of the depth $D_{26}$ and width $W_{26}$ of the detent 26 to the inside diameter $D_{20}$ of the bushing 12 ranges from 3.00:1 to 3.75:1, and more specifically, from 3.20:1 to 3.55:1, and even more specifically, from 3.32:1 to 3.43:1.

The bushing 12 includes one or more materials configured to provide the bushing 12 with a relatively high hardness, whereby the compression limiter 10 is configured to withstand compressive forces imparted by a fastener 110, as discussed below. In some examples, the bushing 12 includes a metal alloy, such as carbon steel. More specifically, the bushing 12 may include 12L14 steel, or a mechanical equivalent. The bushing 12 may be carbonized of carbonitride to a minimum depth of 0.010" to provide the surface with a hardness of at least Rockwell C HRC 30. The bushing 12 may also be zinc plated and baked for hydrogen embrittlement relief.

Referring to FIGS. 6-8, in use the compression limiter 10 is implemented within a mounting tab 102 of a vehicle component 100. For example, where a vehicle component 100 includes a material having a relatively low hardness, such as a molded polymeric material, the compression limiter 10 is incorporated within each mounting tab 102 to provide a load-bearing interface for attaching the vehicle component 100 to a corresponding mounting interface of the vehicle. Examples of vehicle components 100 include fluid components, electrical housings, HVAC components, and other accessories formed of softer materials.

The compression limiter 10 may be co-molded with the vehicle component 100 such that the compression limiter is integrated within the mounting tab 102 of the vehicle component 100. During a molding process, the compression limiter 10 may be loaded into a mold cavity corresponding to the vehicle component 100. Molten material for forming the vehicle component 100 is then provided to the mold cavity (e.g., injection molding) and flows around the exterior surface 18 of the bushing 12. The interior aperture 22 may be plugged by a mold feature (e.g., a pin) during the molding process to prevent the material of the vehicle component from flowing into the aperture 22, thereby forming a clearance hole for receiving the fastener 110 through the mounting tab 102.

During the molding process, the material of the vehicle component 100 flows into the detents 26 at each end 14, 16 of the bushing 12 to form a corresponding retainer 104 within each of the detents 26. The retainers 104 and the detents 26 cooperate to secure the compression limiter 10 within the mounting tab 102 of the vehicle component 100. Specifically, the detents 26 and the retainers 104 prevent axial and rotational movement of the compression limiter 10 relative to the mounting tab 102.

In use, the compression limiter 10 is configured to bear a compressive load applied by the fastener 110 when the vehicle component 100 is attached to the vehicle. For example, the fastener 110 may be a threaded bolt or a rivet used to secure the vehicle component 100 by clamping the mounting tab 102 of the vehicle component 100 between a flange or head of the fastener and a mounting interface of the vehicle. As the fastener 110 is compressed against the mounting tab 102, the hard material of the compression limiter 10 prevents the fastener 110 from deforming (i.e., compressing) the mounting tab 102.

A number of implementations have been described. Nevertheless, it will be understood that various modifications may be made without departing from the spirit and scope of the disclosure. Accordingly, other implementations are within the scope of the following claims.

What is claimed is:

1. A compression limiter comprising:
    a tubular bushing extending from a first end to a second end, the tubular bushing including a cylindrical exterior surface and a cylindrical interior surface extending from the first end to the second end to define an aperture; and
    one or more detents formed in at least one of the first end of the bushing and/or the second end of the bushing;
    wherein each of the one or more detents includes a cylindrical end and a pair of sidewalls connecting the cylindrical end to one of the first end or the second end of the bushing;
    wherein a distance from the cylindrical end to the one of the first end or the second end defines a depth of the detent and a distance from a first one of the sidewalls to a second one of sidewalls defines a width of the detent that is equal to the depth of the detent.

2. The compression limiter of claim 1, wherein the interior surface defines an inside diameter of the bushing and the exterior surface defines an outside diameter of the bushing.

3. The compression limiter of claim 1, wherein each of the one or more detents extends through the bushing from the exterior surface to the interior surface.

4. The compression limiter of claim 1, wherein the one or more detents includes a pair of detents formed in the first end of the bushing.

5. The compression limiter of claim 4, wherein the one or more detents further includes a second pair of detents formed in the second end of the bushing.

6. The compression limiter of claim 1, wherein the bushing includes a chamfered edge at an intersection of the exterior surface with at least one of the first end and the second end.

7. The compression limiter of claim 1, wherein the bushing includes a metal alloy.

8. The compression limiter of claim 7, wherein the bushing is zinc plated.

9. A compression limiter comprising:
a tubular bushing extending from a first end to a second end, the tubular bushing including a cylindrical exterior surface and a cylindrical interior surface extending from the first end to the second end to define an aperture; and
a plurality of detents including a first detent formed in the first end of the bushing and a second detent formed in the second end of the bushing;
wherein each detent of the plurality of the detents includes a cylindrical end and a pair of sidewalls connecting the cylindrical end to one of the first end or the second end of the bushing;
wherein a distance from the cylindrical end to the one of the first end or the second end defines a depth of the detent and a distance from a first one of the sidewalls to a second one of sidewalls defines a width of the detent that is equal to the depth of the detent.

10. The compression limiter of claim 9, wherein the interior surface defines an inside diameter of the bushing and the exterior surface defines an outside diameter of the bushing.

11. The compression limiter of claim 9, wherein each of the first detent and the second detent extend through the bushing from the exterior surface to the interior surface.

12. The compression limiter of claim 9, wherein the plurality of detents further includes a third detent formed in the first end of the bushing and a fourth detent formed in the second end of the bushing.

13. The compression limiter of claim 12, wherein the first detent and the third detent are diametrically opposed to one another.

14. The compression limiter of claim 9, wherein the bushing includes a chamfered edge at an intersection of the exterior surface with at least one of the first end and the second end.

15. The compression limiter of claim 9, wherein the bushing includes a metal alloy.

16. The compression limiter of claim 15, wherein the bushing is zinc plated.

\* \* \* \* \*